United States Patent [19]

Lee

[11] Patent Number: 4,702,713
[45] Date of Patent: Oct. 27, 1987

[54] ELECTRIC TROLLING MOTOR FOOT CONTROL MOUNT

[76] Inventor: Bruce R. Lee, Rte. 8, Box 101, Fredericksburg, Va. 22401

[21] Appl. No.: 726,342

[22] Filed: Apr. 23, 1985

[51] Int. Cl.$^4$ .............................................. B60L 15/20
[52] U.S. Cl. ....................................... 440/7; 114/153; 114/363; 74/480 B; 74/512; 297/429
[58] Field of Search ...................... 440/7; 114/153, 363, 114/364; 411/369, 368, 546, 535, 531, 456; 74/480 B, 478, 512, 560; 297/429, 432, 423

[56] References Cited

U.S. PATENT DOCUMENTS

| 148,434 | 3/1874 | Elliott | 74/560 |
|---|---|---|---|
| 231,017 | 10/1880 | Davis | 114/153 X |
| 2,741,843 | 4/1956 | Sejman et al. | 411/368 X |
| 3,151,910 | 10/1964 | Larson | 114/363 X |
| 4,008,500 | 2/1977 | Hall, Jr. | 114/363 |
| 4,063,321 | 12/1977 | Nichols | 114/363 |
| 4,597,356 | 7/1986 | McCaghren et al. | 114/363 |

FOREIGN PATENT DOCUMENTS 1209095 10/1970 United Kingdom ................ 411/456

Primary Examiner—Joseph F. Peters, Jr.
Assistant Examiner—Paul E. Salmon
Attorney, Agent, or Firm—Harold H. Dutton, Jr.

[57] ABSTRACT

A mount for an electric trolling motor foot control unit having base member, a pedal pivotal about a horizontal axis and motor control switches, the mount comprising a base plate secured to the underside of the base member, a connection at one end of the base plate for pivotally securing the base plate to the floor of a boat for pivotal movement of the base plate and the control unit upon the floor of the boat, the connection including a pivot bushing, whereby the user of the electric trolling motor may move the control unit around on the floor of a boat along a predetermined path without removing the control unit from its attachment to the boat.

6 Claims, 8 Drawing Figures

ELECTRIC TROLLING MOTOR FOOT CONTROL MOUNT

This invention relates to an improved mount for trolling motor foot controls. More particularly, the invention relates to a mount for a trolling motor foot control unit which may be securely mounted in a boat and yet still be adjusted to different positions as needed.

BACKGROUND AND OBJECTS

For a number of years, fishing boats have been equipped with so called "trolling motors" which are small electrically powered motors used by the angler to maneuver a boat from one location to another while fishing. Such motors are usually auxiliary to the main combustion engine used on fishing boats and are used for slow, quiet movement of the boat. Such motors are sometimes mounted by a clamp arrangement to the transom of a boat, but more commonly these trolling motors are attached to the bow of a boat for operation by the front occupant of the boat. In either case, the mounting bracket enables the motor unit and the shaft upon which the motor unit is mounted to be removed from the water to a stowed position when the boat is being powered by the combustion engine.

Some of these trolling motors are steered by a handle which is used to pivot the motor about a vertical axis on its mounting and may also include a speed control switch and an on/off switch for the motor. Simply by moving the handle, the direction of the motor in the water is changed so as to direct the thrust in the desired direction for steering the boat.

However, most such trolling motors are of the so-called foot control type. In this latter type of trolling motor, the steering function is removed to a remote location and a handle is no longer used for the steering. Instead, a remote foot control unit is provided, and is usually connected to the motor mounting shaft and motor unit by cables. Electric cables connect the switches mounted in the foot control to the motor unit for on/off and speed control, and push/pull cables connect the foot control through a rack and pinion gear train to the shaft and motor unit for accomplishing the steering of the motor by again pivoting the motor about the vertical axis. Usually this vertical axis is passes through the mounting shaft.

Generally, the remote end of the steering cable is connected to a foot pedal which is mounted for pivotal movement about a horizontal axis, so that moving the pedal in one direction will cause the motor to turn to, e.g., the left, and moving the pedal in the other direction will cause the motor to pivot to the other direction.

The trolling motor unit and the shaft upon which the motor itself is mounted are usually attached to the boat by means of a bracket arrangement which is bolted to a deck surface of the boat for a rigid connection of the motor to the boat. However, in the past the foot control unit is simply allowed to rest on the floor of the front deck of the boat. In this manner, the foot control unit may be moved around on the front fishing platform to suit the user. Since often the fisherman may fish off of one side of the boat for a while, and then change to fish off of the other side of the boat, it is convenient to be able to move the foot control unit around on the fishing platform easily to accommodate the user's needs at any particular moment.

However, this flexibility of movement of the foot control is accompanied by a significant disadvantage. Since the foot control unit simply rests on the floor of the boat, it is not secured in place. Thus, when the boat is moved at high speeds and/or in rough water, the foot control unit is free to bounce around in the front of the boat, and it is restrained only by the cables which connect it to the motor unit. But, these cables simply will keep the control pedal from bouncing out of the boat and being lost, and will not keep the unit in place.

This problem of the foot control unit bouncing around will often result in damage to the foot control unit, possible breakage of the control cables and damages to the boat itself.

To prevent the possibility of such damage, occasionally the angler will secure the foot control unit to the floor of the boat by screws or the like, but in so doing, the flexibility in the use of the control unit discussed above is lost, and the the user must adjust himself to fit the control, rather that adjusting the control to fit his needs.

The problems of flexibility and possible damage are even more acute in the case of competitive fishing events. In such events, the flexibility of the use of the trolling motor can significantly alleviate fatigue of the user. Further, the loss of use of the trolling motor as by damage can result in loss of use of the boat for the day and possible loss of money in the competitive event.

For these reasons, there is a significant need for a mounting arrangement for the foot control units of trolling motors which will enable flexibility in use while at the same time providing a secure means for preventing the control unit from bouncing around in the boat.

Accordingly, a primary object of the present invention is to provide a mount for a trolling motor foot control unit which enables flexibility in use while simultaneously enabling the control unit to be securely attached within the boat.

Another object of the invention is to provide a mount for a trolling motor foot control unit which may be easily adjusted by the user to position the unit for maximum comfort.

A further object of the invention is to provide a mount for a trolling motor foot control unit which permits the control to be adjusted along a path for comfort.

Still another object of the invention is to provide a mount for a trolling motor foot control unit which is relatively inexpensive.

Still a further object of the invention is to provide such a mount which can be easily adapted to any type of trolling motor and boat.

Yet another object of the invention is to provide a foot control mount which may be attached to the boat either without drilling holes or by minimum hole drilling in the floor of the boat.

These and other objects of the invention will become apparent when considered in light of the following description and claims when taken together with the accompanying drawings.

DESCRIPTION OF THE INVENTION

The trolling motor foot control mount according to this invention comprises a base plate for mounting the control unit, with the base plate being movably attached to the boat. The base plate may be an integral part of the foot control unit extended to the length necessary, or it may be an additional plate to which an existing control unit is attached, for example by screws.

In the preferred embodiment, the base plate has a hole at one end thereof, and a pivot bushing passes through the hole and is secured to the floor of the boat by means of a single pivot screw passing through the center of the pivot bushing.

In another embodiment, the pivot bushing may be spaced from the floor by means of a washer or shim. This latter feature may be appropriate in the case of boats having carpeting on the floor, to accommodate the thickness of the carpet pile.

In another embodiment, the pivot bushing may be in the form of a conduit to provide a passage through which the electric and/or mechanical cables may pass to reduce clutter on the floor of the boat.

In these embodiments, the pivot bushing is secured to the floor in such a manner that the base plate may pivot about the point of attachment, carying with it the control unit, so that the control unit may be easily positioned to the left, to the right, or at any point in between at the will of the user, simply by moving the plate with the foot.

Generally, the friction of the plate on the floor or the carpet will hold the unit in place until it is intentionally moved. In addition, the fastening of the pivot to the floor will prevent the control unit from bouncing around in the boat in rough water.

In an alternate embodiment, the base plate is provided with a larger hole at the end remote from the control unit, and the base plate may be slipped over the seat pedestal. In this manner, the seat pedestal, which is usually already installed in the boat, acts as the pivot pin for the base plate, and no further attaching holes need be drilled in the boat. Generally, such seat pedestals are removable from the base mounting hole, which in turn is permanently provided in the floor, usually as standard equipment on such boats.

In still another embodiment, a pair of tracks may be secured to the floor, and corresponding members on the base plate may be provided for engaging the tracks. In this manner, the base plate, and the control unit, may be moved along the tracks to a desired point for use.

DESCRIPTION OF THE PREFERRED EMBODIMENTS

Figure 1:
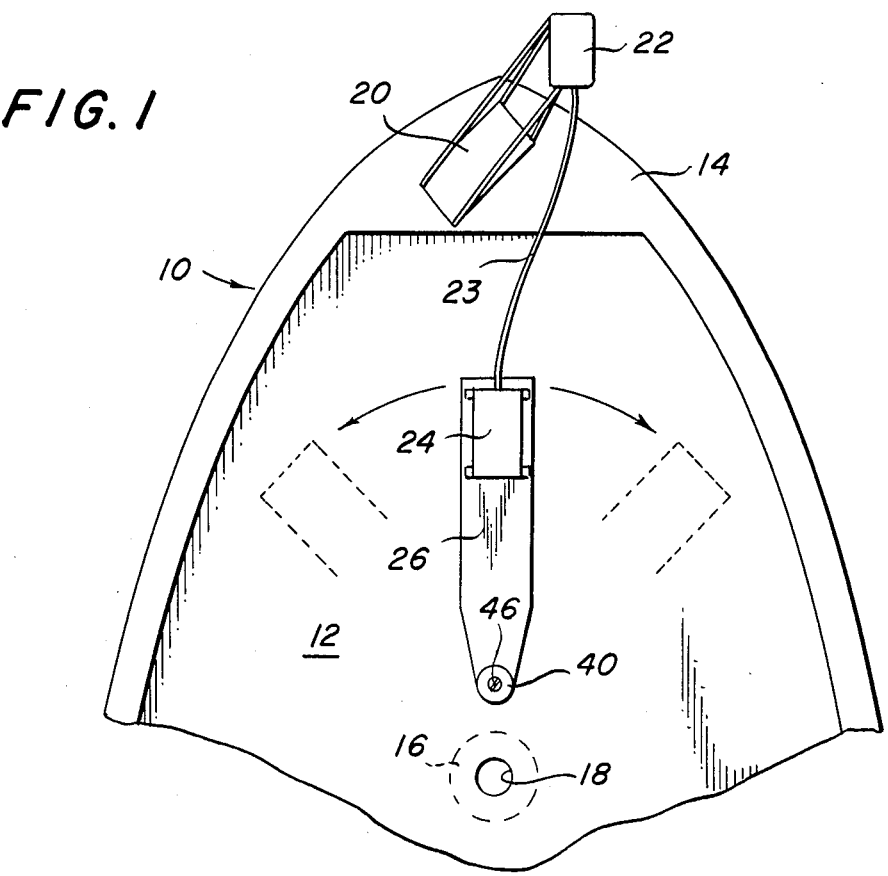
FIG. 1 is a top plan view of the front fishing platform of a boat showing the invention in use.
Figure 2:
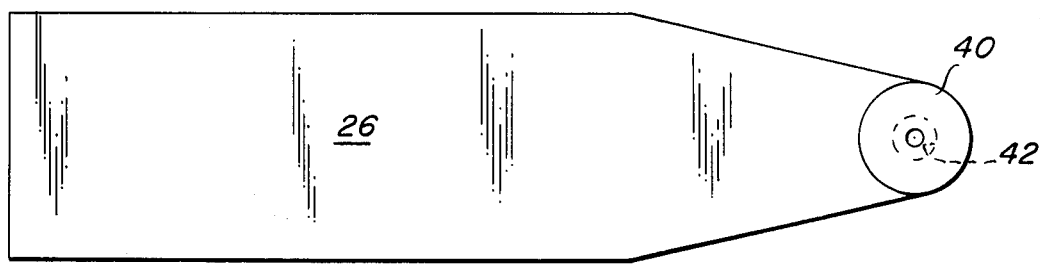
FIG. 2 is a top plan view of one embodiment of mount according to the invention with the control unit removed.
Figure 3:
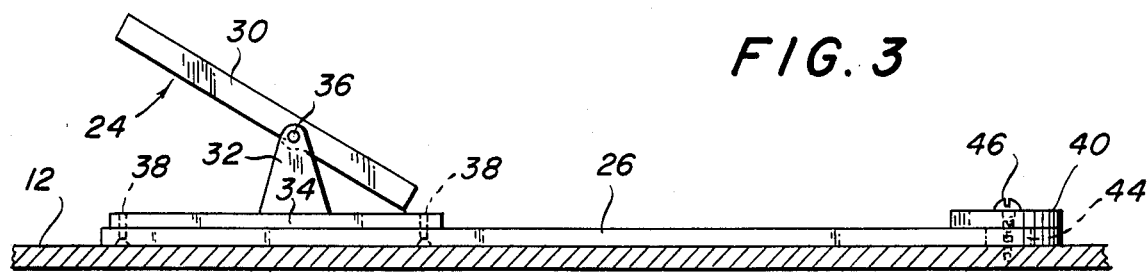
FIG. 3 is a side elevation view of a mount according to this invention installed in a boat.

Referring now in greater detail to the drawings, the operation of the invention is generally shown in FIGS. 1-3, in which FIG. 1 shows the front or bow section of a fishing boat with the invention installed therein. The boat is generally designated 10 and includes a floor 12 and deck area 14. The floor usually has a seat pedestal mounting base 16 provided with a pedestal mounting hole 18 therein. The base 16 is usually attached to the floor of the boat by screws or bolts (not shown) and then covered by carpeting.

The deck area provides a flat surface upon which a trolling motor may be mounted. The trolling motor includes a mounting bracket 20 which is bolted to the deck in a conventional manner for supporting the motor and shaft portion 22 beyond the edge of the boat and in the water. The motor unit 22 is connected by means of one or more cables 23 to a foot control unit 24, and the foot control unit 24 is provided with switches and a steering mechanism for controlling the direction of thrust of the motor unit 22. The arrangement described thus far is conventional.

According to the invention, a substantially planar base plate 26 is provided, and the foot control unit 24 is attached to this base plate 26. The base plate 26 may be made of any suitable material, such as aluminum or plastic, so long as the plate is sufficiently rigid to prevent undue flexing.

As seen in FIG. 3, the foot control unit 24 typically includes a pedal member 30 pivotally mounted on suitable stanchions or the like 32 which in turn are supported by a bottom member 34. In this manner, the pedal member 30 may pivot about a horizontal axis 36 to steer the motor. The bottom member 34 in turn is bolted or otherwise secured to the base plate 26, for example by threaded fasteners 38.

By such a construction, existing foot control units can be mounted according to the invention. However, it will be apparent that the bottom member 34 may be eliminated, if desired, in which case the brackets 32 and the pedal member 30 may be constructed on the base plate 26, thus eliminating the bottom member 34.

In either case, the other end of the base plate away from the foot pedal is attached to the floor of the boat 12 by means of a pivot bushing 40. The bushing 40 is seen to include a head portion of a diameter greater that the opening 42 in the base plate, and also includes a portion 44 of a diameter such as to snugly fit in the opening 42. A screw or bolt 46 then is used to secure the bushing 40 to the floor 12 of the boat. In this manner, the base plate 26 may pivot about the bushing 40, carrying with it the foot control unit 24.

As shown in FIG. 1, the base plate 26 may pivot about the bushing 40 to any point shown by the dotted line positions. Thus, the fisherman may easily move the foot control unit to the right, the left or the center, depending upon which side of the boat he is fishing from. The tightening of the screw 46 will increase the force holding the base plate 26, and the thus foot control 24, in place as necessary.

Figure 4:
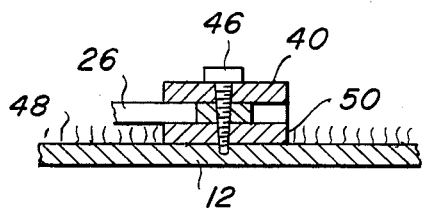
FIG. 4 is an enlarged fragmentary view of a portion of the mount of FIG. 2.

As shown in FIG. 4, often the floor of a boat is covered by carpeting 48, and it such cases, it may be necessary to provide a spacer washer 50. If the washer 50 is the same diameter as the hole 42, the plate 26 will rest on the carpet and usually sufficient friction will be present to hold the plate 26 in place.

Ordinarily, the base plate and foot control movement will not cause significant wear on the carpet. However, if desired, the washer 50 may be of a greater diameter than the hole 42 and of a thickness such as to keep the plate 26 spaced from the floor 12 a distance approximately equal to the thickness of the carpet 48. In either case, tightening of the screw 46 will increase the force holding the plate 26 to the floor. Further, the washer 50 may be a two piece washer with a metal washer above a soft rubber washer. In this manner, tightening of the screw 46 will compress the rubber washer to the point at which the optimum thickness of the spacer is found, according to the pile height of the carpet.

In any case, the outer periphery of the enlarged portion 44 of the pivot bushing 40 serves as a bearing surface, and permits easy movement of the base plate 26 when desired, while the attaching force, coupled with the friction between the base plate 26 and the floor 12 and/or the carpet 48 serves to hold the base plate 26, and the foot control 24 from bouncing around in the boat.

Figure 5:
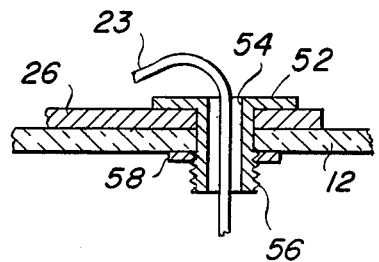
FIG. 5 is an enlarged fragmentary view of a portion of an alternative embodiment of the invention.

In another embodiment shown in FIG. 5, the pivot bushing 52 is provided with a central passageway 54 extending through the bushing 52. The lower end of the bushing is provided with external threads 56 in order that the bushing may be secured by means of a nut 58 beneath the floor 12. In this manner, the electric and/or mechanical control cable 23 may pass through the passageway 54 beneath the floor of the boat to the appropriate connections with the motor. Again, tightening of the nut 58 will increase the holding force on the bushing and the plate 26 as necessary.

Figure 6:
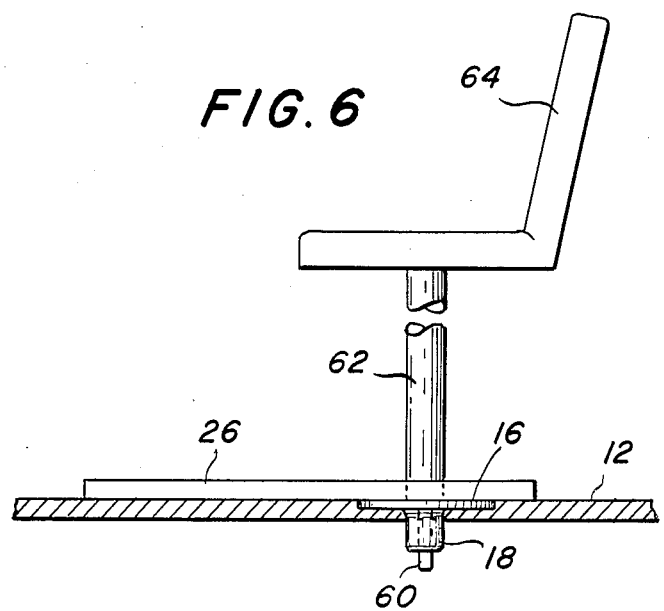
FIG. 6 is a side elevation view of another embodiment of a mount according to the invention.

In the embodiment shown in FIG. 6, the floor 12 of the boat 10 has a seat pedestal base 16 mounted therein in a conventional manner. The socket 18 receives the lower end 60 of the pedestal 62, which in turn supports the seat 64. Here, pedestal passes snugly through the opening 42 in the plate 26 so that the pedestal becomes the pivot for the plate 26 and the control unit 24 mounted thereon. In this case, while the fisherman is seated, he can also move the base plate 26 to the desired position, and yet the foot control unit is still prevented from bouncing around during travel in rough water.

Figure 7:
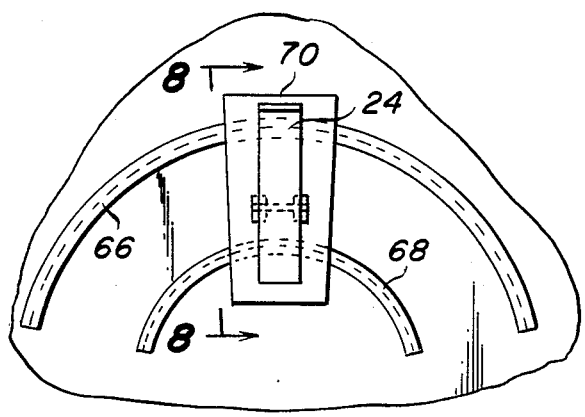
FIG. 7 is a top plan view of another embodiment of a mount according to the invention.
Figure 8:
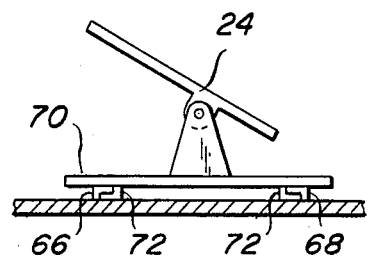
FIG. 8 is a view along lines 8—8 of FIG. 7 and viewed in the direction of the arrows.

In the embodiment shown in FIGS. 7-8, a pair of curved tracks 66 and 68 are fastened to the floor 12 in any suitable fashion. In the embodiment shown, the base plate is formed as the bottom member of the foot control unit, and the base plate 70 has corresponding track engaging members on the bottom thereof. In the case wherein the tracks have an inverted L-shaped cross section as shown, the track engaging members 72 could have a complementary L-shaped configuration whereby the foot control 24 is held to the floor by means of the cooperating tracks and members 72, and yet the foot control unit 24 may still be moved about in the boat by the user to the desired position along a predetermined path.

While this invention has been described as having certain preferred features and embodiments, it will be clear from the foregoing description that the invention is capable of still further modification and variation without departing from the spirit of the invention, and this invention is intended to cover any and all variations which come within the spirit of the invention and the scope of the appended claims.

I claim:

1. A mount for an electric trolling motor foot control unit comprising a substantially planar base plate, control means for steering and motor operation functions comprising a foot pedal mounted for pivotal movement about a horizontal axis mounted on said base plate, means for fastening one end of said base plate to the floor of a boat for movement with respect to the floor while the other end of said base plate slides on the floor, said fastening means including means limiting the movement of said control unit along a predetermined path, said fastening means comprising an aperture formed in said one end of said planar base plate, and pivot means passing through said aperture.

2. A mount for an electric trolling motor foot control unit as in claim 1 and wherein said pivot means comprises a pivot bushing and fastener means passing through said pivot bushing for securing said bushing and said base plate to the floor.

3. A mount for an electric trolling motor foot control unit as in claim 2 and including spacer means beneath said bushing.

4. A mount for an electric trolling motor foot control unit as in claim 3 and wherein said spacer means comprises a metal washer superimposed on a rubber washer.

5. A mount for an electric trolling motor foot control unit as in claim 1 and wherein said pivot means comprises a pivot bushing having an axial passageway therethrough and means for securing said pivot bushing to the floor.

6. A mount for an electric trolling motor foot control unit as in claim 1 and wherein said foot control unit is secured to said base plate by fastener means.

* * * * *